Feb. 25, 1964 H. W. KNOX 3,121,947

METHOD OF MANUFACTURING A MOLD

Original Filed Aug. 13, 1959 2 Sheets-Sheet 1

United States Patent Office 3,121,947
Patented Feb. 25, 1964

3,121,947
METHOD OF MANUFACTURING A MOLD
Harold Wayne Knox, Akron, Ohio, assignor to The Firestone Tire & Rubber Company, Akron, Ohio, a corporation of Ohio
Original application Aug. 13, 1959, Ser. No. 833,559. Divided and this application Mar. 20, 1961, Ser. No. 105,254
1 Claim. (Cl. 29—447)

This invention relates to an improved method of manufacturing molds.

This application is a division of my copending application Serial No. 833,559, filed August 13, 1959.

Modern tire molds are conventionally cast in aluminum by a process which comprises first producing a positive model which is used to make an intermediate plastic mold member and which is then in turn used to make the final plaster mold for the casting operation. Such a succession of steps involves cumulative inaccuracies which may cause the final casting to be as much as 0.030 inch out of round and as much as 0.030 inch off in diameter.

Moreover, modern tire molds are usually two-piece molds which meet in a center parting plane so that each mold-part forms a half-portion of the tread pattern and the adjacent sidewall of the tire. The primary objection to center-parting molds is the relative inaccuracy which, noted above, attends the casting of the tread pattern portion of the mold into circular shape. As a further objection to using such two-part molds, there is the additional difficulty of aligning the two mold halves to put them exactly in register with each other. In most cases, even if the mold halves are perfect as to dimension, it is impossible to register them more accurately than about 0.016 inch. When such two-piece, center-parting molds are used, the inaccuracies in casting and in registering together may total as much as 0.046 inch; tires produced in such molds will accordingly be out-of-round by the same amount.

In contrast, the present invention solves these problems of accurate manufacture and of alignment in use by providing a three-part mold in which the upper and lower end parts serve to mold the beads, sidewalls and shoulders of the tire, while the intermediate part takes the form of a continuous ring, cast in one piece, which molds the tread of the tire from one shoulder of the tire to the other.

The ring comprises a deformable tread molding portion which is assembled with a relatively massive and rigid backing ring in a manner so as to compensate for and correct the dimensional inaccuracies which are inherent in the casting operation. As a result, an accurate, truly round tire mold is obtained which will produce an accurately molded and truly round tire.

This type of mold has the advantage that the different parts, upper and lower end sections and intermediate section, may be produced and finished independently of one another, either in different parts of a shop, or even at different manufacturing localities.

In conventional tire molds which carry half of the tread-forming portion and a sidewall-forming portion in each mold half, the area of the mold most susceptible of trapping air during vulcanization of a tire is where the upper sidewall and shoulder join the tread. Since the mold of the present invention provides for parting lines at this very area, the tendency is to bleed air from the mold, rather than trapping it, a very real advantage in producing faultless and fully molded tires.

It is accordingly an object of the present invention to provide a method of making a mold which will produce a truly round tire.

It is a further obbbject to make a three-piece mold which is economical and easy to produce, while being extremely accurate in roundness and registry.

A further object of the invention is the provision of a method of making a mold in which one intermediate portion molds the entire width of the tire tread.

Another object of the present invention is the provision of a method of making a mold adapted for immediate interchangeability in a variety of automatic vulcanizing processes.

Still further, it is an object to provide a method of mold manufacture in which a relatively thin-walled tread ring is assembled within the bore of a massive backing ring to hold it in true round condition.

It is the further object to minimize the difficulties in casting thin-walled parts of varying cross-section, and to reduce the number of defects experienced from such casting.

These and other advantages and objects will become apparent by reference to the following specifications and drawings, in which FIGURE 1 is a fragmentary sectional view of a tire vulcanizing press incorporating a mold constructed in accordance with the invention, the mold being shown in closed position and with a tire therein;

Figure 1:
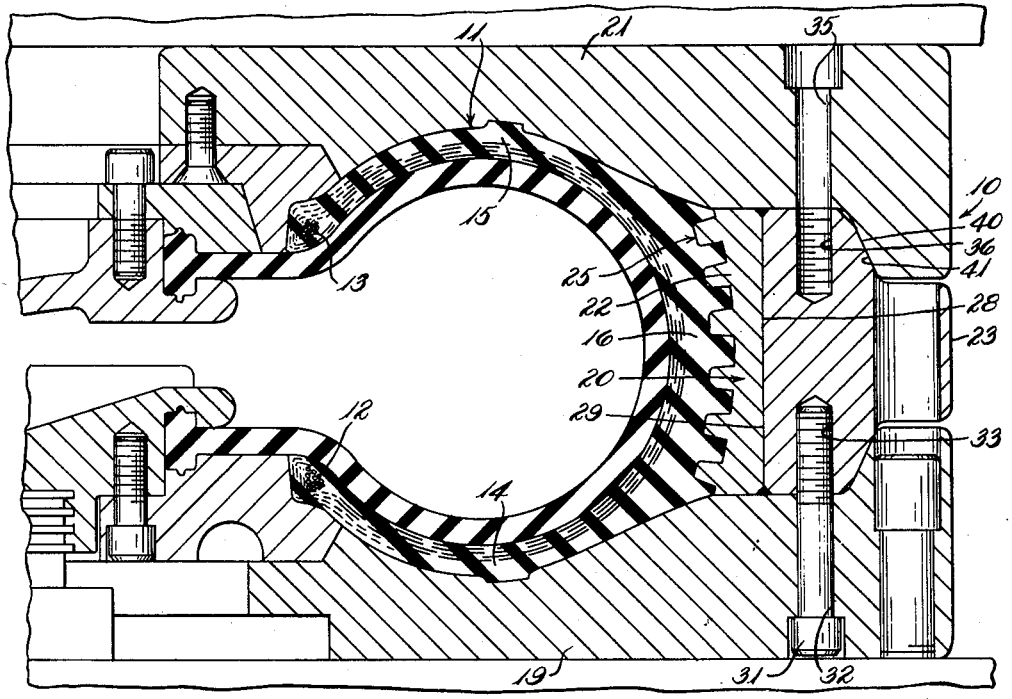

Referring now to the drawings, a preferred form of the present invention is shown embodied in a three-part tire mold, indicated generally at 10, which is intended to mold a pneumatic tire 11 having beads 12 and 13, sidewalls 14 and 15 and a tread portion 16 having a conventional tread pattern formed by circumferential and lateral grooves which break up the surface into the desired arrangement of traction blocks.

Figure 2:
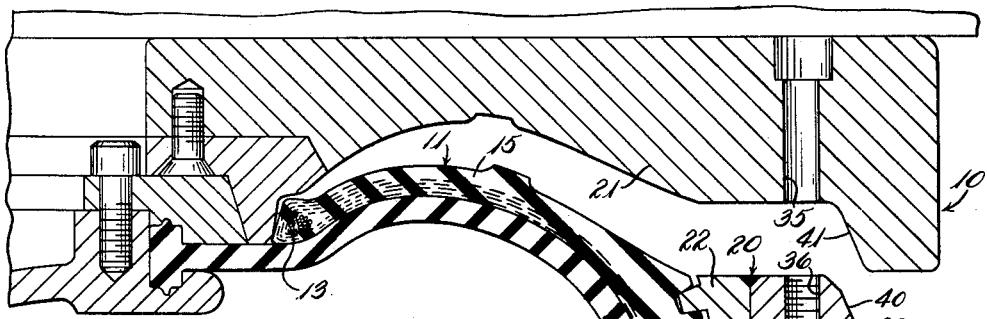
FIGURE 2 is a view similar to FIGURE 1, showing the mold in the partially open position.
Figure 2:
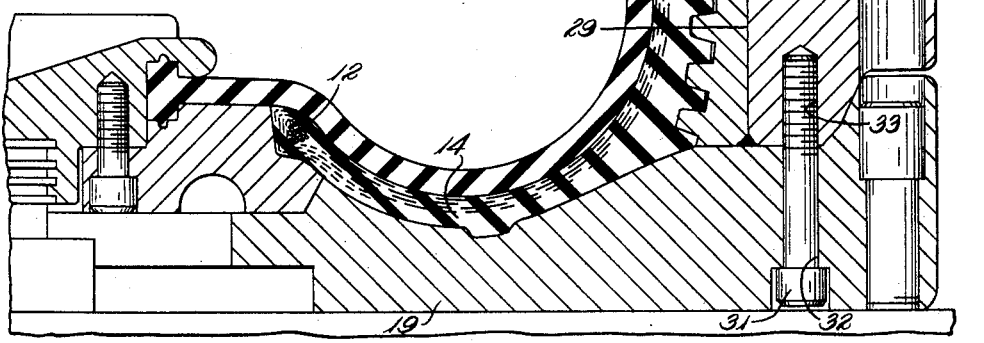

The mold 10 can be used in the type of automatic tire vulcanizing press such as that shown and described in U.S. Patent No. 2,495,664 to Soderquist, in which the tire is retained in the bottom part of the mold and stripped therefrom after the press is opened. FIGURES 1 and 2 show the mold 10 mounted in such a press.

Figure 3:
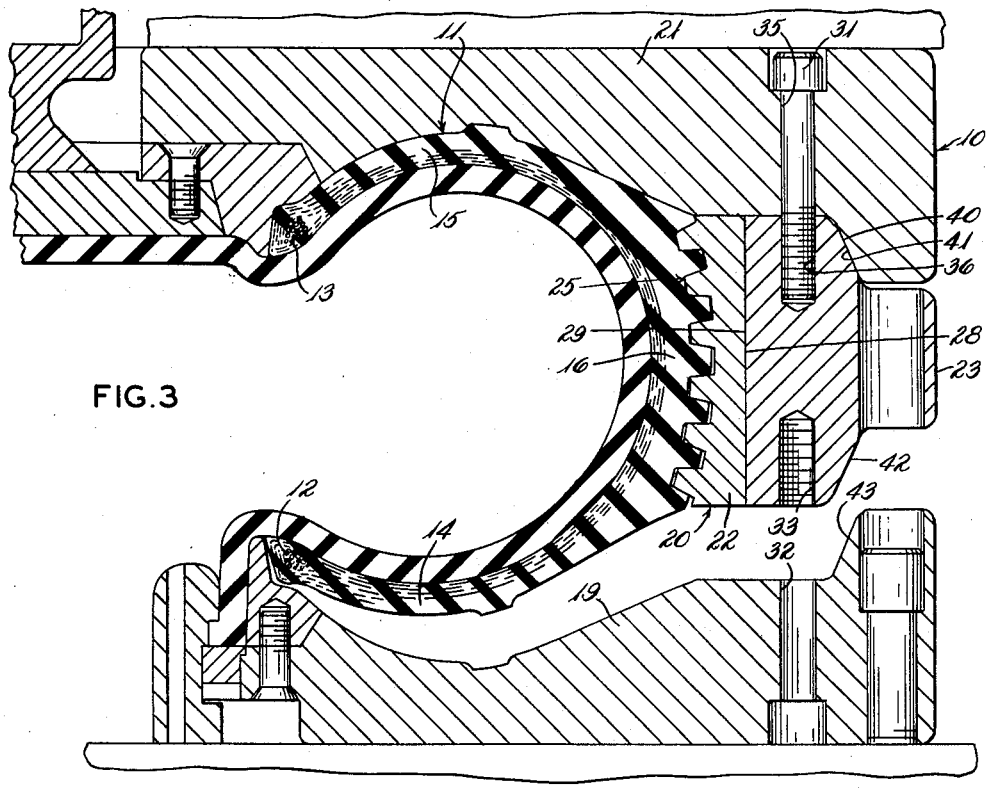
FIGURE 3 is a view similar to FIGURE 2, showing the mold being used in an alternative type of vulcanizing press.

Alternatively, the mold can be used in another type of vulcanizing press which is in common use in the tire industry, such as that shown and described in U.S. Patent No. 2,730,763 to Brundage, in which the tire is retained in the top portion of the mold and stripped therefrom after the press is opened. FIGURE 3 shows the mold mounted in the latter type of press.

This ready adaptability of the mold to use in either type press will be referred to later after the mold 10 has been described in detail.

As mentioned above, the mold 10 comprises three operational parts, a bottom end portion 19 which molds bead 12 and sidewall 14 of the tire, a top end portion 21 which molds the upper bead 13 and the sidewall 15 of the tire, and a central ring part 20 which molds the tread portion 16 from shoulder to shoulder of the tire.

This central ring 20 comprises an inner portion 22, hereinafter referred to as the tread ring, which is cast in aluminum in the form of a relatively thin-walled cylinder, and an outer portion 23, referred to as the backing ring, which supports the tread ring externally.

Figures 4, 5:
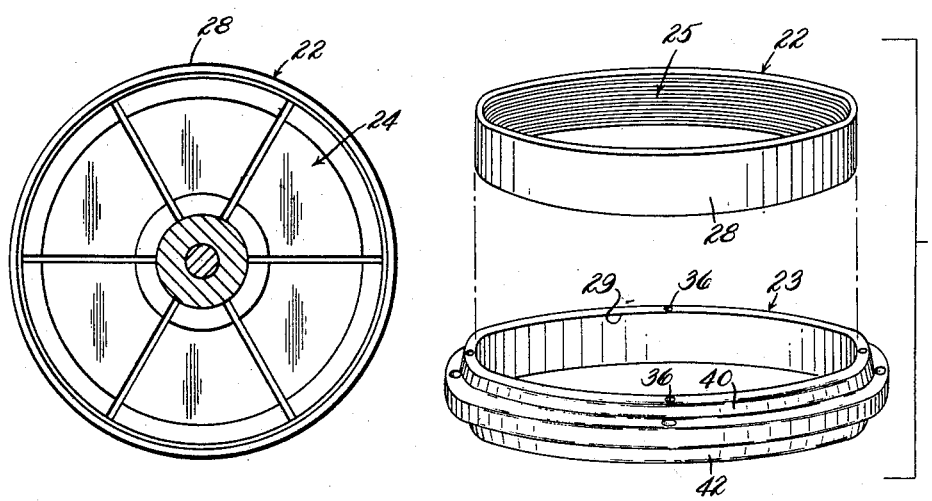
FIGURE 4 is a plan view of the tread ring and the expansible chuck.
FIGURE 5 is an exploded perspective view of the tread ring and backing ring.

After the tread ring 22 is cast, the shrinkage, warpage, and out-of-round tolerances are all corrected by placing the ring in a suitable expanding chuck 24, see FIGURE 4, which upon expansion will force the interior surface 25 of the ring, i.e. the surface which forms the tread pattern of the tire, into a perfectly round condition. The tread ring 22 is sufficiently thin-walled so that it will deform readily in this operation. While the tread ring 22 is held accurately by the chuck 24, the outer cylindrical surface 28 of the ring is accurately machined to a surface which is coaxial with the interior tread-forming surface 25. When the machined tread ring is released by the chuck, it will tend to spring back into its as-cast, out-of-round condition, but this springback will finally be corrected when the backing ring 23 is assembled with the machined outer surface 28 of the tread ring 22.

The backing ring 23, in contrast to the tread ring 22, is massive and heavy-walled, so that it can adequately perform its function of supporting the tread ring 22. Preferably, the backing ring is an aluminum casting which is heat-treated to relieve the internal stresses and then machined to produce a bore 29 which is an accurate cylindrical surface adapted to receive the tread ring with a tight fit. To insure this, the diameter of the bore 29 is machined slightly smaller than the diameter of the surface 28 of the tread ring, the difference preferably being in the order of about 0.012 inch.

The tread ring 22 and the backing ring 23 are finally assembled by heating the backing ring so that the diameter of bore 29 will expand sufficiently to receive the tread ring with its normally larger outer diameter. If difficulties are encountered in this assembly operation, the tread ring may be held to circular shape in a chuck to facilitate its insertion into the backing ring. As the assembly is allowed to cool, the backing ring will shrink forcibly upon the tread ring and, since the backing ring is designed to be sufficiently massive to resist distortion, its machined inner cylindrical surface 29, by coaction with the outer surface 28 of the tread ring, will hold the tread ring in true cylindrical shape.

Normally, the force with which the backing ring shrinks upon the tread ring will hold the tread ring securely in place during the tire curing operations. It may be desirable, however, for the tread and backing rings to be more securely assembled. In such case, the two may be welded together by circumferential welds at the outer juncture of the parts, or the parts may be fastened together by other mechanical means, such as dowel pins, bolts, etc.

This trend ring assembly has a number of advantages. It enables a tread pattern to be cast into a ring which is relatively thin-walled, a feature which minimizes the molding difficulties and defects which tend to occur when a part of varying cross-section is to be cast, as in the case of conventional mold halves. By reason of its thin wall, the tread ring 22 can be readily distorted to overcome the inaccuracies resulting from the casting operation and to enable an accurate outside surface 28 to be machined thereon; at the same time, the thin wall insures that, upon assembly of the ring 22 with the relatively rigid back-up ring 23, the tread ring will be held in true circular form.

The use of a three-part mold embodying the present invention has a further advantage of the interchangeability and adaptability to use in either of the two types of automatic presses presently available on the market and in use by the tire industry. In one press, see FIGURES 1 and 2, the tire is normally retained in the lower end mold section when the press is opened and the upper mold section is lifted from the tire. The tire is then stripped from the lower mold end section by apparatus available for that purpose.

The mold 10 is readily used in such a press, for in such case the ring 20 is secured to the lower end mold portion 19 by means of a plurality of bolts 31 which pass through holes 32 in the lower mold end section to engage threaded holes 33 which are drilled and tapped in the body of the backing ring 23 to hold the parts 19 and 20 firmly together. The mold sections are then secured to the press in the usual manner. In order to accurately position the mold portions in relation to each other when the mold closes, there is provided an upper pair of mating registering surfaces 40 and 41 on the backing ring and upper mold end portion, respectively.

The mold 10 may also be used in the other type of press, FIGURE 3, in which the tire is normally retained in the top mold end section when the press is opened and then later stripped from that section by suitable mechanism; in that case, the ring 20 will be secured to the top mold end section 21 by bolts 31 which pass through holes 35 bored in the upper mold end section to engage the threaded holes 36 which are drilled and tapped in the upper surface of the backing ring 23. For purposes of true registration of the mold parts upon closing the mold, a pair of lower mating registration surfaces 42 and 43 is provided on the backing ring and bottom mold end portion, respectively. Thus, the tire will be retained in the upper mold end section and then stripped from it in the normal operation of such press.

This feature of ready adaptability to the two types of presses which are in use in most tire plants provides a flexibility in scheduling and manufacturing operations which represents a considerable saving in time and money.

The use of such a three-section tire mold furthermore is of advantage in that it enables an economical change of tread designs, since the upper and lower mold end sections may be used with any tread design and with interchangeable tread rings. The mold of the invention also minimizes the cost of scrap in the manufacture of molds, for even if one of the mold parts should be defective, the other two parts can be used with a single replacement part. This advantage is, of course, retained in production, in the event one of the mold parts is damaged and must be replaced.

What is claimed is:

The method of manufacturing a tire mold which comprises casting a substantially cylindrical, out-of-round, thin-walled metal tread ring bearing a tread pattern on its inner surface, chucking said tread ring on said inner surface and forcing said inner surface to true circular form at every section thereof within the elastic limit of said tread ring, machining the outside surface of said tread ring to a true cylindrical surface coaxial with and concentric with the axis of said inner surface while holding said inner surface in circular form, removing said machined tread ring from the chuck and allowing said tread ring to return to said out-of-round condition with a substantially uniform wall thickness, heating a relatively massive backing ring having an accurately machined, cylindrical bore to expand said bore, inserting said thin-walled tread ring within the bore of said backing ring, and thereupon shrinking said backing ring onto said tread ring, whereby the massive backing ring is shrunk onto the tread ring and the bore of the tread ring is caused to assume a true circular configuration.

References Cited in the file of this patent

UNITED STATES PATENTS

| | | |
|---|---|---|
| 1,780,003 | Chance | Oct. 28, 1930 |
| 1,974,949 | Campbell | Sept. 25, 1934 |